United States Patent [19]

Logan et al.

[11] 4,192,056
[45] Mar. 11, 1980

[54] ASSEMBLY TOOL

[75] Inventors: Maurus C. Logan, Elizabeth, N.J.; John M. Cole, New Hope, Pa.; Peter Garner, Chatham, N.J.

[73] Assignee: Thomas & Betts Corporation, Raritan, N.J.

[21] Appl. No.: 860,576

[22] Filed: Dec. 14, 1977

[51] Int. Cl.² .......................... G02B 5/14; B23Q 3/00
[52] U.S. Cl. .................................. 29/468; 29/271; 29/407; 29/721; 350/96.21; 350/320; 356/383
[58] Field of Search ............... 29/256, 271, 407, 464, 29/468, 520, 525, 721; 350/96.20, 96.21, 81; 356/383

[56] References Cited

U.S. PATENT DOCUMENTS

| | | | |
|---|---|---|---|
| 3,508,806 | 4/1970 | Hall | 350/81 X |
| 3,999,841 | 12/1976 | Dakss et al. | 350/96.20 |
| 4,087,155 | 5/1978 | Deacon | 29/464 |

*Primary Examiner*—Milton S. Mehr
*Attorney, Agent, or Firm*—James J. Daley; Jesse Woldman; David Teschner

[57] ABSTRACT

A tool for fixing the position of an optical fiber with respect to the connector containing same. The connector containing an optical fiber is fastened to a movable connector support which is moved into position with respect to a collar that causes portions of the connector to retract and expose the fiber adjacent the index of a gauge. The position of the fiber end can be adjusted while viewing the fiber end and the index through a magnifying device properly illuminated.

4 Claims, 13 Drawing Figures

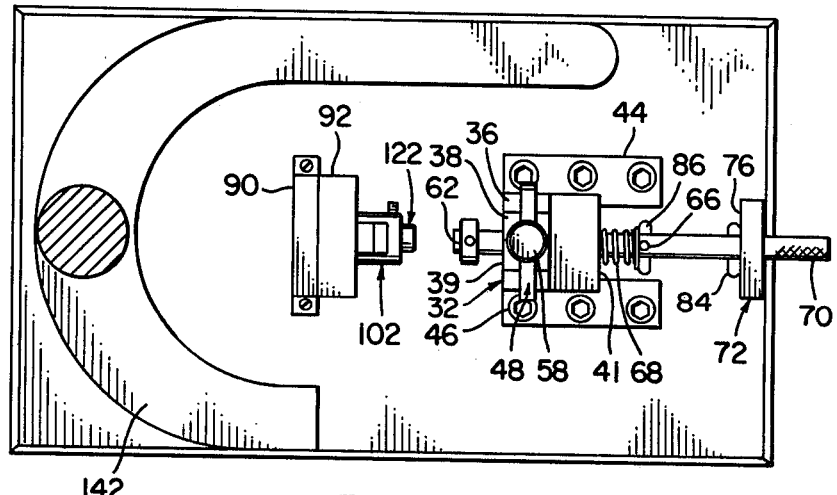
FIG. 3
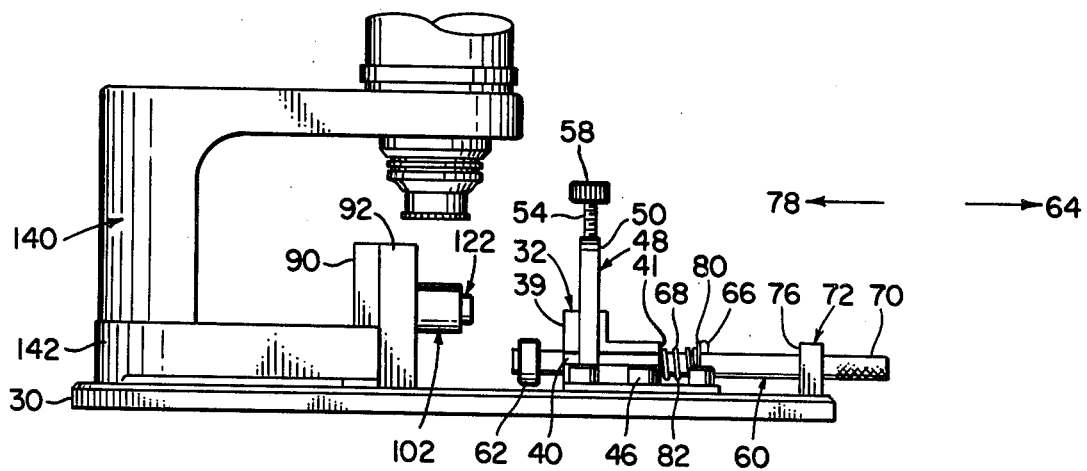
FIG. 2
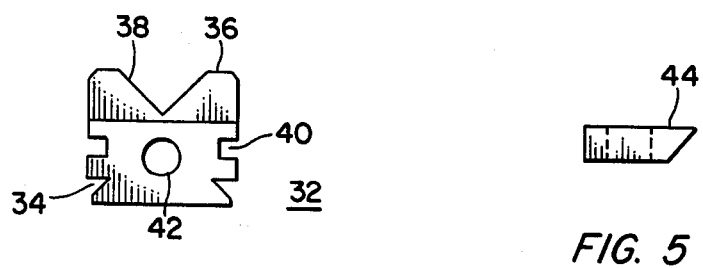
FIG. 4
FIG. 5

ASSEMBLY TOOL

CROSS-REFERENCES TO RELATED APPLICATIONS

Optical Fiber Connector Ser. No. 852,229 filed Nov. 17, 1977 in the names of Maurus C. Logan, John M. Cole and Peter Garner and assigned to the assignee of the instant invention.

BACKGROUND OF THE INVENTION

1. Field of the Invention

The invention pertains to tools for positioning the ends of small objects adjacent prescribed index positions and is useful for positioning small wires and, in particular, the positioning of the ends of optical fibers with respect to their connectors.

2. Description of the Prior Art

No device is known that performs the functions of the instant tool.

SUMMARY OF THE INVENTION

The invention relates to a tool which can be used to fix the end of an optical fiber with respect to the connector containing same. A gauge device is fixedly mounted to a base and contains a collar and an index. A connector containing an optical fiber is clamped to a movable block, movable upon tracks also fixedly mounted to the base. The movable block is capable of movement towards or away from the gauge device by means of forces applied by an operator to a rod connected to such block. When the movable block brings the fiber connector into contact with collar, a portion of the connector is displaced exposing the optical fiber. With the use of a microscope, the end of the fiber can be brought into the correct position by adjusting the connector. Certain fixed stops and bias springs assure the correct positions of the fiber and connector. It is an object of this invention to provide a tool for positioning the end of an optical fiber with respect to a connector containing such fiber.

It is another object of this invention to provide a tool which permits the accurate positioning of an optical fiber with respect to a connector carrying such fiber.

It is another object of this invention to provide a tool which fixes the position of a connector while permitting the manipulation of an optical fiber carried by such connector.

It is a further object of this invention to provide a tool which fixes the position of a connector and provides an index to permit the accurate positioning of the optical fiber end with respect to the fixed connector.

Other objects and features of the invention will be pointed out in the following description and claims and illustrated in the accompanying drawings, which disclose, by way of example, the principles of the invention, and the best mode which has been contemplated for carrying it out.

BRIEF DESCRIPTION OF THE DRAWINGS

In the drawings in which similar elements are given similar reference characters.

FIG. 2 is a fragmentary side elevational view of the tool of FIG. 1.

FIG. 3 is a top plan view of the tool of FIG. 1 with the microscope and light source removed to expose additional details of the tool.

FIG. 4 is a front elevational view of the connector support of the tool of FIG. 1.

FIG. 5 is a front elevational view of the rails for the connector support of the tool of FIG. 1.

DESCRIPTION OF THE PREFERRED EMBODIMENTS

Figure 12:
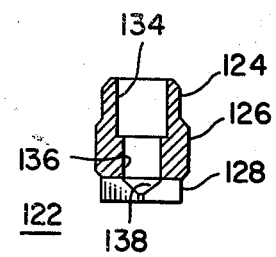
FIG. 12 is a top plan view, in section, of the device of FIG. 11.
Figure 13:
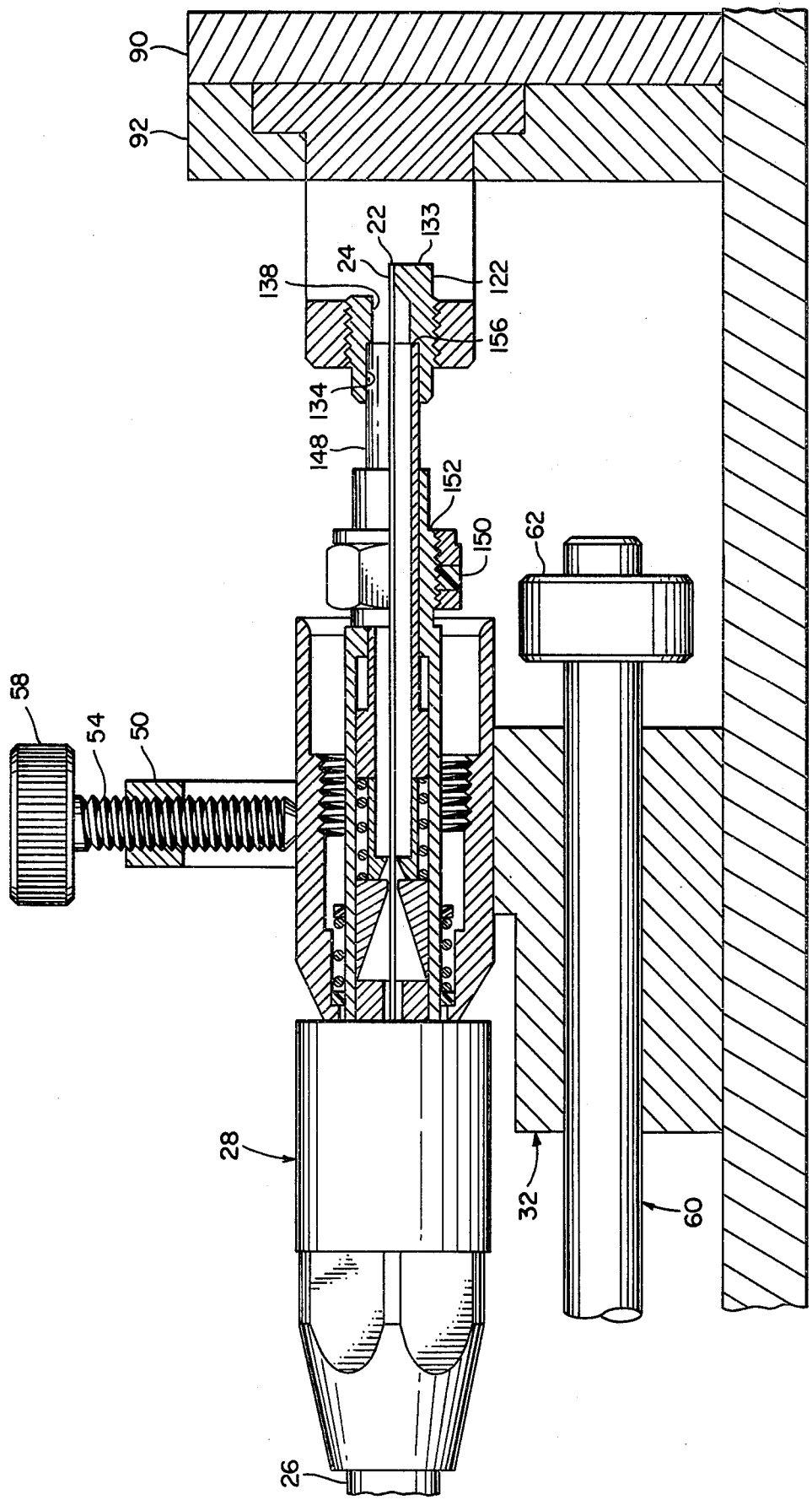
FIG. 13 is a fragmentary, side elevational view partially in section illustrating the manner of positioning an optical fiber with respect to a connector carrying such optical fiber.

Turning now to FIGS. 1 to 13 there is shown a tool 20 for properly positioning the end 22 of an individual optical fiber 24 of a fiber optic cable 26 with respect to a connector 28 carrying such optical fiber 24 (See FIG. 13). The connector 28 is shown, described and claimed in the copending application for U.S. Letters Patent as identified above and by this reference made a part hereof. Tool 20 has a base 30 upon which all the major components are mounted.

A connector support block 32 (See FIGS. 1 and 4) has sawtooth shaped recesses 34 which receive complementarily shaped rails 44 (See FIG. 5) and permit the support block 32 to be moved only along the path established by the rails 44. Fasteners 46 hold the rails 44 to the base 30. A V-notch 38 is placed in top surface 36 of support block 32 to receive a connector 28. A clamp 48 (See FIG. 6) has a hoop-shaped body 50 terminating in inturned ribs 52 which are free to move along the recesses 40 of the support block 32. Centrally positioned in body 50 is a threaded aperture (not visible) into which is threadably engaged a threaded rod 54. The end 56 of threaded rod 54 can be brought into contact with a connector 28 in V-notch 38 by rotation of the rod 54 employing the knurled head 58. With a connector 28 in V-notch 38 the movement of end 56 of rod 54 into engagement with such connector 28 also causes the inturned ribs 52 of clamp 48 to engage the top surfaces defining recesses 40 and thus lock the clamp 48 to the support block 32 and the connector 28 to the support block 32. Similarly, the retraction of end 56 of rod 54 from connector 28 permits the removal of the connector 28 and the clamp 48 from the support block 32.

A drive rod 60 (See FIG. 7) passes through an aperture 42 in support block 32 to an annular collar 62 adjustably affixed to drive rod 60 by a suitable fastener. As will be described below, the drive rod 60 is moved in the direction of arrow 64 in FIG. 2, until the annular collar 62 engages rear surface 39 of support block 32 and any further movement in such direction causes support block 32 to move along rails 44. Movement of the drive rod 60 in the direction of arrow 64 is terminated by the engagement of the radial pin 66 with the rear surface 76 of a bearing block 72. Bearing block 72 is permanently affixed to the base 30 and has an aperture 74 extending therethrough which provides a support and bearing to the drive rod 60 which passes through the aperture 74. To lock the drive rod 60 to this position the drive rod 60 is rotated about its longitudinal axis to place radial pin 66 in the recess 84 (See FIG. 3) in base 30. Placed upon the drive rod 60 between the radial pin 66 and the surface 41 of the support block 32 are a washer 80 and a stiff compression spring 82. As the drive rod 60 is moved in the direction of the arrow 78, the rod 60 freely moves through the aperture 42 in support block 32 and aperture 74 of bearing block 72 until the end 68 of spring 82 engages the surface 41 of the support block 32. Any further movement of the drive rod 60 causes the support block 32 to move in the direction of arrow 78 of FIG. 2, due to the forces applied to drive rod 60 being applied by way of radial pin 66, washer 80 and stiff spring 82. The position of drive rod 60 can be fixed by rotation of drive rod 60 about its longitudinal axis to cause radial pin 66 to enter recess 86 in base 30. The end of drive rod 60 is knurled as at 70 to make grasping the rod easier.

Figure 1:
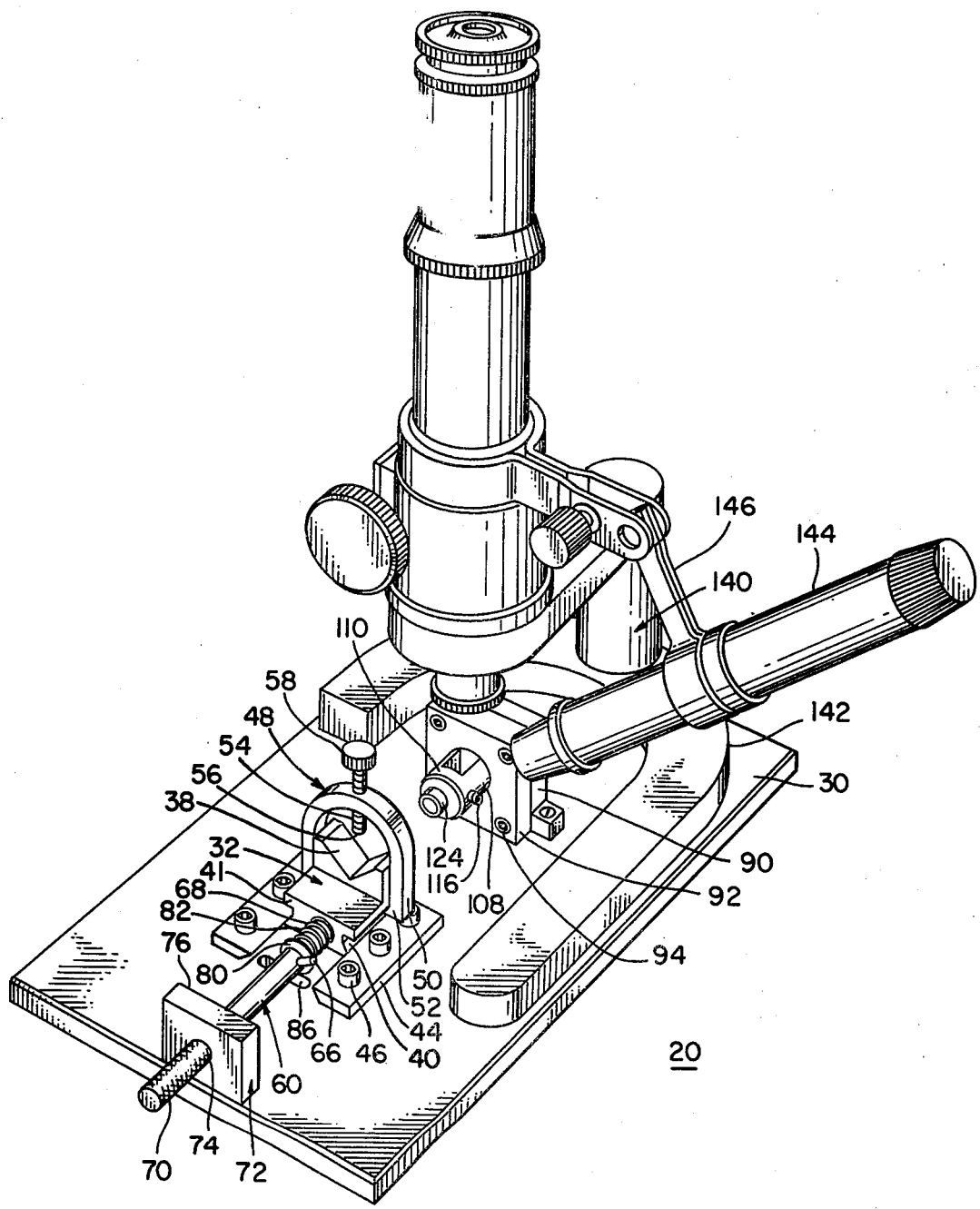
FIG. 1 is a prospective view of a tool constructed in accordance with the concepts of the invention.
Figure 6:
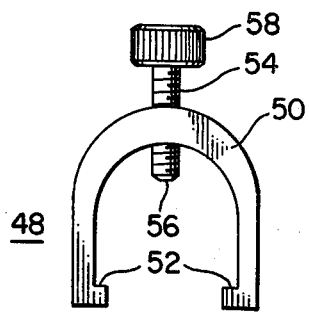
FIG. 6 is a front elevational view of the clamp of the tool of FIG. 1.
Figure 7:
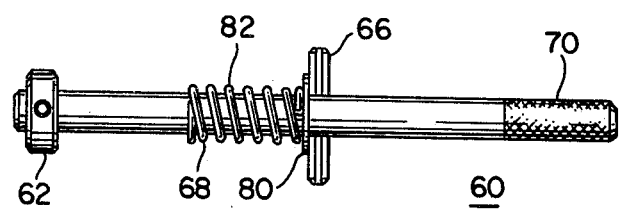
FIG. 7 is a side elevational view of the drive rod of the tool of FIG. 1.
Figure 8:
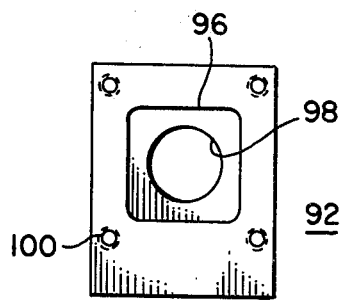
FIG. 8 is a front elevational view of the gauge centering plate of the tool of FIG. 1.
Figure 9:
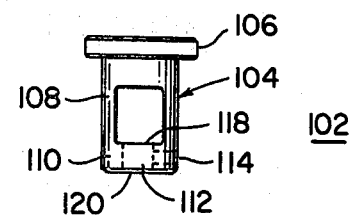
FIG. 9 is a top plan view of the floating gauge mount of the tool of FIG. 1.
Figure 11:
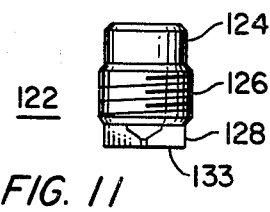
FIG. 11 is a top plan view of the positioning gauge of FIG. 10.
Figure 10:
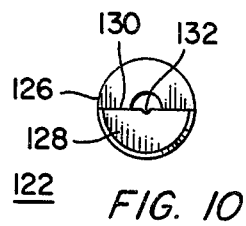
FIG. 10 is a front elevational view of the positioning gauge of the tool of FIG. 1.

Affixed to base 30 is a support 90 having a gauge centering plate 92 mounted thereon by fasteners 94 (See FIG. 1). Gauge centering plate 92 (See FIG. 8) has a generally square recess 96 which communicates with a centrally located circular aperture 98. Four apertures 100 are provided to receive the fasteners 94 used to connect the gauge centering plate 92 to the support 90. Floating gauge mount 102 (See FIG. 9) has a cylindrical main body 104 terminating in a generally square rim 106 corresponding closely to the recess 96 of the gauge centering plate 92. Similarly, the cylindrical body 104 corresponds closely to the circular aperture 98 of plate 92. Accordingly, the floating gauge mount 102 is assembled to the support 90 by positioning gauge mount 102 such that its cylindrical body 104 passes partially through aperture 98 of the gauge centering plate 92 and the rim 106 is fully seated in the recess 96 of plate 92. Fasteners 94 are now used to assemble the gauge centering plate 92 to the support 90. The cylindrical body 104 is milled out to provide a pair of parallel arms 108 terminating in an annulus 110 having a circular bore 112 (shown in dashed lines in FIG. 9) extending therethrough. A further bore 114 extends perpendicular to bore 112 for the receipt of a set screw 116 to hold an object placed in the bore 112. Annulus 110 has a first face 118 and a second face 120. Placed in the bore 112 and held by the set screw 116 is positioning gauge 122 as seen in FIGS. 10, 11 and 12. Positioning gauge 122 has a cylindrical body 124 positioned adjacent face 120 of floating gauge mount 102, and a threaded central portion 126 positioned in the bore 112 of gauge mount 102 and held there by set screw 116. Gauge portion 128 is positioned adjacent face 118 of floating gauge mount 102. As is best seen in FIG. 10, the gauge portion 128 is a hemisphere providing a flat gauging surface 130 into which is inscribed a recess 132 large enough to receive an optical fiber. Rear edge 133 provides a gauge mark to measure the fiber length. A first bore 134 extends through body 124, a second bore 136 extends through central portion 126 into gauge portion 128 and terminates in tapered shoulders 138 within gauge portion 128.

Due to the fine diameter of the optical fiber 24 it is difficult to position the optical fiber 24 with respect to the rear edge 133 of the positioning gauge 122 employing the naked eye. Some type of magnifying device is required. A microscope 140 is employed for this purpose. The base 142 of the microscope 140 is rigidly fixed to the base 30 in such a position so as to place the center of the objective over the rear edge 133 of the positioning gauge 122. A concentrated illuminating source or flashlight 144 is held in position by a clamp 146 coupled to microscope 140 which permits the light to be positioned where needed.

Turning now to FIGS. 1 and 13, the method of use of the tool 20 will be made apparent. The connector 28 carrying an optical fiber 24 is placed in V-notch 38 of support block 32 and clamp 48 is made to hold connector 28 to support block 32 by advancing threaded rod 54 until end 56 contacts the connector 28. The body 50 of clamp 48 is held in place by the forces exerted on support block 32 by the inturned ribs 52. The rotation of drive rod 60, using knurled portion 70, disengages radial pin 66 from recess 84 and allows longitudinal forces applied to drive rod 60 to move the drive rod 60 in the direction of arrow 78 (FIG. 2). When all slack has been removed and the radial pin 66 engages washer 80, which engages the stiff compression spring 82, the support block 32 is caused to move along the rails 44 until the desired position of the connector 28 is reached. At that time the drive rod 60 is rotated to place the radial pin 66 in the recess 86 to fix the position of drive rod 60 with respect to the base 30. The forwardmost position of the support block 32 is set by the position of the knurled portion 70 of drive rod 60. In use, the forward position of the support block 32 is set by the connector 28 position on the support block 32 and the position of the body portion 124 of positioning gauge 122. Rearward movement of support block 32 in the direction of arrow 64 (See FIG. 2) is limited by the position of the radial pin 66 and its engagement with surface 76 of bearing block 72.

As the support block 32 advances, the leading edge 156 of pin housing 148 strikes the shoulder between bores 134 and 138 of positioning gauge 122 and further forward movement of the pin housing 148 is prevented. As a result the fiber 24 is caused to protrude beyond the pin housing 148 onto the gauging surface 130 of positioning gauge 122. When the support block 32 is at the end of its travel the end of fiber 24 should be in line with rear edge 133 of positioning gauge 122. To correct for any errors the adjusting nut 150 is operated to alter the position of the fiber 24 with respect to connector 28. When the fiber 24 length has been correctly set the connector 28 is released from the support block 32 by causing threaded rod 54 to be rotated to remove the contact between the connector 28 and the support block 32. The withdrawal of the connector from the positioning gauge causes the pin housing 148 to move about the fiber 24 to protect it. When the full connector is assembled, as described in the above identified application, the fiber 24 will now lie at the center line of the connector making coupling to a similar optical fiber possible.

While there have been shown and described and pointed out the fundamental novel features of the invention as applied to the preferred embodiments, it will be understood that various omissions and substitutions and changes of the form and details of the device illustrated and in its operation may be made by those skilled in the art, without departing from the spirit of the invention.

We claim:

1. A tool for positioning an optical fiber within a connector, comprising; gauge means having an index thereon to indicate the desired position of an optical fiber within a connector; connector support means for engaging and retaining a connector having an optical fiber therein and means for moving said connector support means towards and away from said gauge means; a base member; stationary coupling means to couple said gauge means to said base member; movable coupling means to movably couple said connector support means so that said connector support means can be moved towards and away from said gauge means, a first recess adjacent said connector support means; a second recess remote from said connector support means; said means for moving said connector support means is a rotatable rod coupled to said connector support means which can be moved by an operator grasping said rod; and a stop pin coupled to said rod for engagement with either of said first or second recess upon rotation of said rod to fix the position of said connector support means at a first or a second position.

2. A tool for positioning an optical fiber within a connector, comprising: gauge means having an index thereon to indicate the desired position of an optical fiber within a connector; connector support means for engaging and retaining a connector having an optical fiber therein and means for moving said connector support means towards and away from said gauge means and an annulus to engage a connector containing an optical fiber and cause a portion of the connector to recede and inject the optical fiber adjacent said gauge means.

3. The method of positioning an optical fiber within a connector comprising the steps of securely fastening a connector containing an optical fiber to a movable support; translating said movable support towards a gauge means and into contact with a collar to cause a portion of such connector to retract and expose a portion of the optical fiber; positioning said optical fiber adjacent an index on a gauge means and adjusting said connector until the end of said optical fiber is aligned with said index.

4. The method of claim 3 further comprising the step of viewing the optical fiber end through a magnifying device to more accurately position the fiber end with respect to said index.

* * * * *